Figure 1:
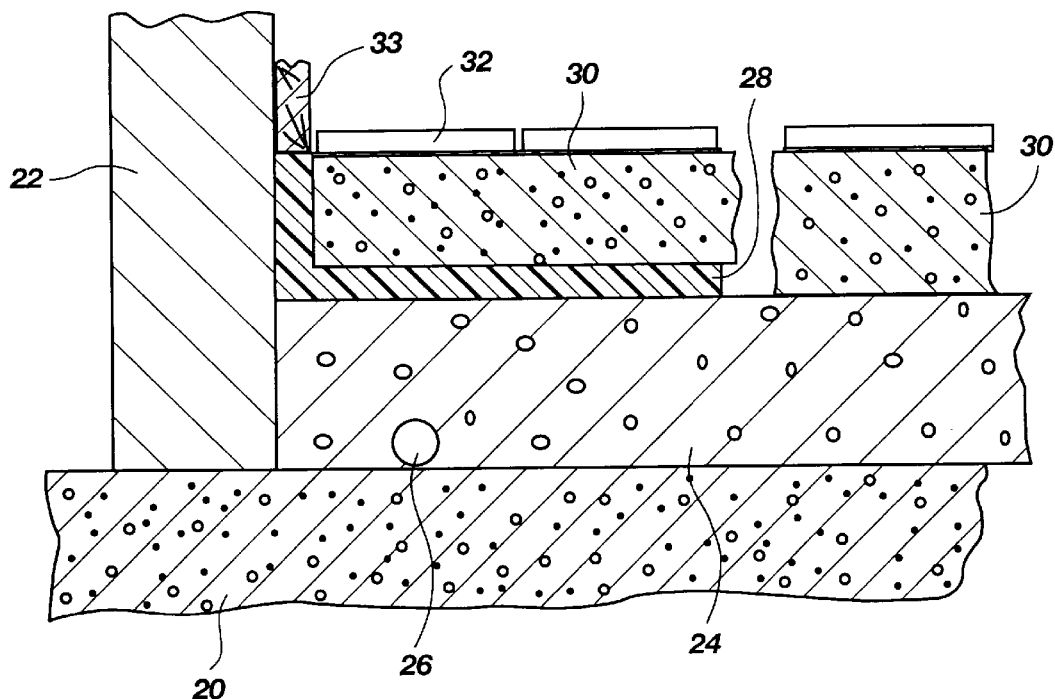

United States Patent

Blockèn

[11] Patent Number: 5,904,763
[45] Date of Patent: May 18, 1999

[54] INSULATING MORTAR

[76] Inventor: Wilfried Blockèn, Industrielaan 35, B-3730 Hoeselt, Belgium

[21] Appl. No.: 08/913,488
[22] PCT Filed: Mar. 14, 1996
[86] PCT No.: PCT/EP96/01084
  § 371 Date: Sep. 19, 1997
  § 102(e) Date: Sep. 19, 1997
[87] PCT Pub. No.: WO96/30315
  PCT Pub. Date: Oct. 3, 1996

[30] Foreign Application Priority Data

Mar. 24, 1995 [BE] Belgium ............................. 9500266

[51] Int. Cl.$^6$ ..................................... C04B 18/18
[52] U.S. Cl. .................. 106/696; 106/724; 106/727; 106/745; 106/808
[58] Field of Search ..................... 106/724, 745, 106/696, 808, 727; 52/DIG. 7, DIG. 9

[56] References Cited

U.S. PATENT DOCUMENTS 4,229,225 10/1980 Kraszewski et al. .
4,407,676 10/1983 Restrepo .
5,387,282 2/1995 Jakel .................................. 106/675
5,641,815 6/1997 Fehlmann ............................ 521/154

FOREIGN PATENT DOCUMENTS

| 379135 | 11/1985 | Austria . |
| 854767 | 9/1977 | Belgium . |
| 60-31879 | 7/1985 | Japan . |
| 61-141511 | 6/1986 | Japan . |
| 409020573 | 1/1997 | Japan . |

OTHER PUBLICATIONS

"Utilization of Polyurethane Foame Wastes" Dreval et al. Kholod. Tekh. (1991), (7), 31.

Primary Examiner—Paul Marcantoni

[57] ABSTRACT

The invention concerns insulating mortar which displays very good heat-insulating properties. It contains at least 70 vol. %, preferably at least 80 vol. %, in particular at least 85 vol. %, recycled, comminuted hard polyurethane, the remainder consisting of cement and optionally additives as well as water for setting purposes.

14 Claims, 1 Drawing Sheet

INSULATING MORTAR

The present invention applies to an insulating mortar, which is employable for floor- and roof fillings with high insulating thermal and acoustic qualities.

The invention has its most important use in the building industry, it is suitable for the covering of concrete layers and as a filling material in different types of buildings.

A composition known from document WO-91 04 291 is supposed to provide the covering layer; it consists of a mixture of phenol resin and cement. An ester catalyst speeds up the reaction between the two components. The mixture can be employed as a filling material, as solid material and as a reinforcement piece.

Furthermore, an insulating material based on cement and vermiculite is known from document EP-A-0 219 579. This product has a heightened resistance to pressure and to forces of pressure. It can be utilized for the production of pre-manufactured panels.

Both documents concern an insulating material with high insulating qualities, thermal as well as acoustic, yet this material does not allow the recycling of waste products.

The present invention has made it its task to convert a waste product, which is found in high quantities, into a valuable product.

The insulating mortar according to the invention has considerably higher insulating values than the already existing mortars, typical values being:

lambda=0.05 W/mK.

On increasing the cement portion of the mixture, one can increase the resistance to pressure and change the insulating values.

Recycled polyurethane from various industrial branches serves as a basic component. Some examples for this would be car bumpers, insulating roof panels, refrigerators, freezers, boilers and other waste products containing solid polyurethane.

This solid polyurethane foam is ground up into a mixture of pieces and refined granulates with a grain size <8 mm and mixed up to achieve a constant volume, because the provided materials possess a different density in the area from 35 kg/m$^3$ to more than 200 kg/m$^3$.

After very diligent blending, additional substances such as cement, hydraulic lime and dye are added to achieve a dry mortar mixture, which hardens under the addition of water. This dry mixture is packed in paper or plastic bags. One only has to add water, which makes it also possible to produce the mixture at the place at which it will be used.

The mortar according to the application consists of at least 70%, preferably 80% ground up and thus recycled foamed solid polyurethane, the rest is cement; if needed, aggregates, especially a dye, is added. The amount of cement is chosen in such a way that at least a satisfying or even a strengthened setting can be reached. Thus the addition of cement cannot fall below a certain value, which is largely defined by the surface area of the ground up polyurethane. A preferred percentage is 94%; however, 90% to 94% vol percentage is acceptable.

The size of the polyurethane pieces is not very important, yet it has been shown that pieces sized less than 20 mm, preferably even less than 8 mm, can be handled easily. During the grinding, dust emerges. This dust portion fills the otherwise empty space between particles and increases the total surface area. Thus, if there is a large portion of dust, more cement needs to be added.

It has been shown to be of great advantage to add an antifoaming agent to the basic mixture. For this purpose, light acids or acidic salts are used; they have the task of destroying the bubbles which appear during the mixing. An addition of below 3%, preferably below 1% of the weight of the whole mixture is usually sufficient.

It has also shown to be of advantage to utilize an interlacing or surface-active agent; for this task, one usually utilizes phosphates. An addition of less than 1% has shown itself to be adequate.

It is also of advantage to add a liquefier such as melamine resin, naphthalene, sulfite liquor (e.g. dried sulfite liquor). The amount of added liquefier can also remain below 1% of the weight of the whole mixture.

Finally, retarders and accelerators for the setting of the cement can be added; such additives are generally well known for concrete, these additives are also adequate for the insulating mortar.

A preference has developed to add coloring pigment, since it gives the mortar mixture a desirable uniformity of color. Especially suitable as such a coloring pigment are iron oxide ($Fe_2O_3$), which is present as a powder with a maximal granule size of 2 micrometers. Enough is added to achieve a sufficient coloring.

It is possible to reinforce the insulating mortar; suitable for this purpose are mats, especially plastic mats, as well as material in lumps, such as lumpy pieces of synthetic material and the like.

Further advantages and qualities of the invention are revealed in the other claims and the now following description of examples of usage, which are not to be understood as limiting. They will be explained with the help of the drawing. The drawing shows:

FIG. 1: A diametric view of the structure of a floor and

Figure 2:
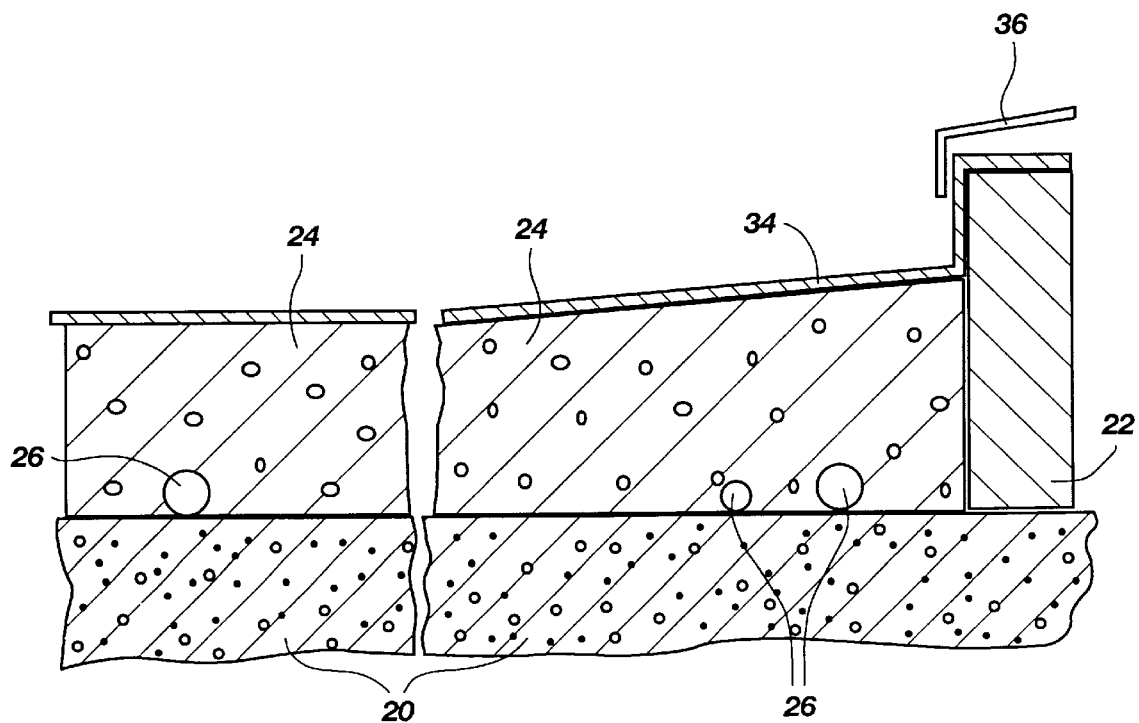

FIG. 2: A second diametric view of a roof structure, once sloped, once horizontally.

A layer of the insulating mortar according to the invention (24) is spread on a concrete layer (20), which supports a wall (22). Previously, the necessary tubing, conveyed here through a tube (26), has been put down on the concrete and is then covered by the insulating mortar.

Usually, a minimal thickness of layer 24 of 3 cm is kept, the usual thickness being between 5 and 10 cm.

A mixture of polyurethane grains and pieces is used for the insulating mortar; 30 to 40% of the weight of the mixture consists of fine dust with a granule size of below 0.1 mm. 10% of the mixture has a granule size of more than 2 mm.

The layer 24 is on the side immediately adjacent to the wall 22. In the left embodiment of FIG. 1, on top of the layer 24 there is an insulating layer 28, such as is usually used for footfall sound insulation and is often prescribed. This layer 28 can be left out, as is shown in the right part of FIG. 1 where such a layer is not provided. The layer 24 provides an adequate footfall sound insulation.

A layer of floor pavement 30 is found above layer 28, yet in the right part of the picture immediately on layer 24. It is slightly reinforced and typically has a strength of 5 cm. On top of it, the actual flooring, here represented through tiling, is found. Opposite of the wall 22, the floor pavement is distanced either through layer 28 or through drawn-up material of the insulating mortar. A bottom rail 32 is envisioned.

Typically, the insulating mortar is compressed after appliance, for example through light stamping with a flat tool. Flat boards are suitable, for example those having a surface of between ¼ and ½ m$^2$, which are connected with a handle. With the help of the handle, the plate is pressed onto the loose piling up of mortar and thus compresses and also equalizes it. Other ways of compressing the mortar are possible.

In the embodiment according to FIG. 2, the structure of a flat roof, in the right part sloped, in the left part horizontal, is shown. A layer 24 of the insulating mortar is applied immediately onto the load-bearing concrete ceiling 20; in the right part of the picture the task is completed in such a way as to show a slope after compression, in the left part of the picture, on the other hand, an even level surface emerges. Again it is possible to provide tubing or the like (26). On the top, layer 24 is covered immediately by a seal 34 which insures that the structure is waterproof. On the right, the flat roof 22 is terminated by a small wall 22, which is overlapped by a protective profile.

EXAMPLE

To obtain 50 l net of ready-to-use mortar, take a sack of dry mixture according to the invention with a volume of about 76 l and a weight of about 23 kg and mix it for about one minute in a compulsory mixer of the type STOW or HST while adding water. One can also use a concrete mixer, a simple mixer, a blowing machine of the type Estromat™ or a floor pavement machine of the type PFT.

With one sack of dry mixture with a volume of 76 l one can cover 1 m² of surface with an insulating mortar layer of 5 cm thickness. The specific weight is about 450 kg/m³. The resistance to pressure is at least 2 kg/m². The insulating agent according to the invention can also be used for the production of insulating plates, isolation panels destined for usage in partitions and/or for building bricks.

What is claimed is:

1. An insulating mortar composition with high thermal insulating properties comprising at least 70 vol. % recycled, ground, solid polyurethane and the remainder cement.

2. The insulating mortar composition according to claim 1, wherein the amount of recycled, ground, solid polyurethane is at least 80 vol. %.

3. The insulating mortar composition according to claim 1, wherein the amount of recycled, ground, solid polyurethane is at least 85 vol. %.

4. An insulating mortar composition for floor and roof fillings with high thermal insulating and acoustic properties for sound reduction comprising a dry mixture of 6 to 10 vol. % cement, 90 to 94 vol. % recycled solid polyurethane that is ground into a mixture of powder and granule, and filler.

5. The insulating mortar composition according to claim 4, wherein the dry mixture comprises 92 vol. % recycled solid polyurethane and 8 vol. % cement.

6. The insulating mortar composition according to claims 4, wherein the granule size is less than 8 mm.

7. The insulating mortar composition according to claim 1 or 4, wherein the mixture further contains a component selected from the group consisting of slaked lime, pigments, or a combination of these components.

8. The insulating mortar composition according to claim 1 or 4, wherein the mortar has a specific weight of about 300 to 450 kg/m³.

9. The insulating mortar composition according to claim 1 or 4, further containing an antifoaming agent.

10. The insulating mortar composition according to claim 1 or 4, further containing a surfactant.

11. The insulating mortar composition according to claim 1 or 4, further containing a liquefier.

12. The insulating mortar composition according to claim 1 or 4, further containing a thixotropic additive.

13. The insulating mortar composition according to claim 12, wherein the thixotropic additive is methyl cellulose.

14. A method for making a building element by using the insulating mortar composition of claim 1, wherein the mortar is filled into a mold and compressed into a set shape.

* * * * *